(No Model.)
O. W. KETCHAM.
BICYCLE TIRE.
No. 554,493. Patented Feb. 11, 1896.
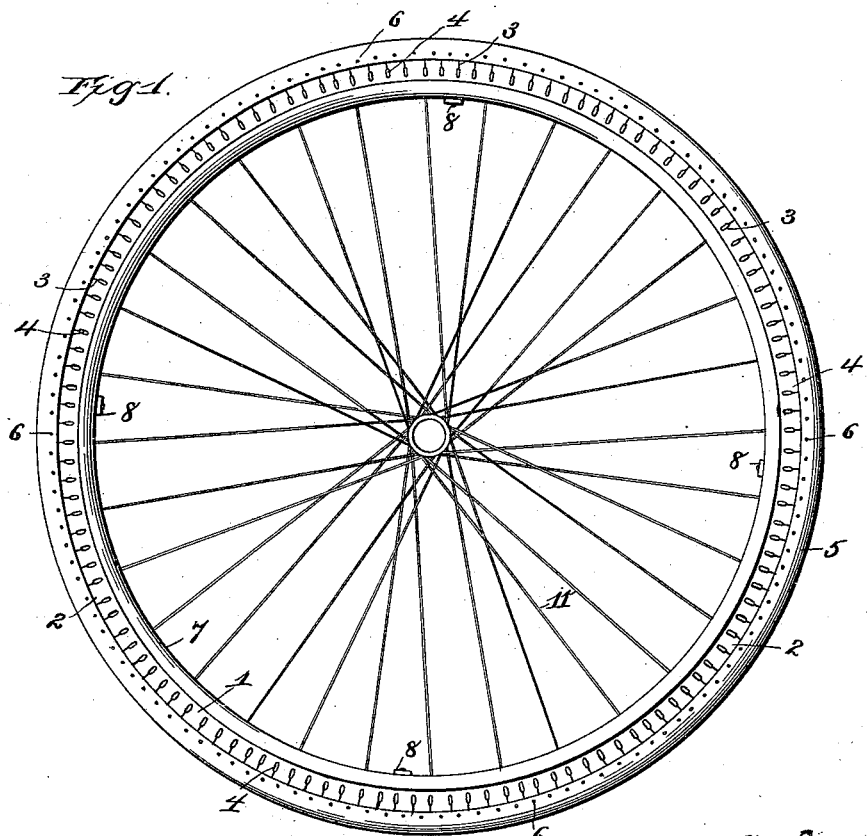
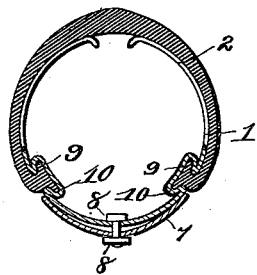
Witnesses:
E. C. Wurdeman
J. J. Williamson
Inventor
Orman W. Ketcham
by Geo. H. Holgate
Attorney

UNITED STATES PATENT OFFICE.

ORMAN W. KETCHAM, OF BROOKLYN, NEW YORK.

BICYCLE-TIRE.

SPECIFICATION forming part of Letters Patent No. 554,493, dated February 11, 1896.

Application filed June 11, 1895. Serial No. 552,418. (No model.)

*To all whom it may concern:*

Be it known that I, ORMAN W. KETCHAM, a citizen of the United States, residing at Brooklyn, in the county of Kings and State of New York, have invented certain new and useful Improvements in Bicycle-Tires, of which the following is a specification.

My invention relates to a new and useful improvement in tires for bicycles, and has for its object to produce such a device that will have the elastic and resilient action of a pneumatic tire without the liability of puncturing.

With these ends in view the invention consists in the details of construction and combination of elements hereinafter set forth, and then specifically designated by the claims.

In order that those skilled in the art to which this invention appertains may understand how to make and use the same I will describe its construction and operation in detail, referring by number to the accompanying drawings, forming a part of this specification, and in which—

Figure 1 represents a wheel of a bicycle having applied thereto my improved tire. Fig. 2 is a sectional view showing the application of the tire and rim.

Similar numbers denote like parts in both views of the drawings.

1 is a circular band of thin sheet metal, formed in cross-section into the general shape of a tube, so that its edges will lie parallel to each other and in juxtaposition. This tubular ring is divided into the sections 2, formed by the slots 3 and openings 4, whereby a series of springs are formed that are independent of each other. Thus it will be seen that in use when the contact-point of the tire is forced against the ground by the weight of the rider the spring-sections 2 at that point will yield and in conjunction with the rubber band afford a resilient action that will be similar to that of a pneumatic tire. In passing over pronounced projections, such as stones, the tire will yield as readily as a pneumatic tire, permitting the stone to be pressed below the surface of the tire without lifting the wheel from contact with the ground, whereby the rider is not made perceptible of the unevenness.

The rubber tire 5 is formed with flanges 9 and the circular metal tube provided with T-shaped grooves 10 upon either side thereof, into which these flanges are adapted to be forced; and this serves the same purpose as the rivets in the above-described construction, and has the advantage of covering the slots and openings in the metal tube, whereby dirt is prevented from gaining access to the inside of said tube.

In case my improved tire is applied to a wheel in its construction the rim 7 may be omitted and the spokes 11 secured directly to the circular metal tube.

While the pneumatic tire has proved very efficient in overcoming the jar and vibration incident upon the rapid passage of a bicycle over uneven surfaces, a great disadvantage has been experienced in that such tires are easily punctured and the air exhausted therefrom, whereby they are rendered useless and often occasion great annoyance and inconvenience to a rider at a distance from repair-shops; but by the use of my improvement this disadvantage is entirely obviated and yet a tire produced which has all the desirable features of a pneumatic tire without its disadvantages.

It is obvious that many slight modifications might be made in the exact construction shown and described without departing from the spirit of my invention.

Having thus fully described my invention, what I claim as new and useful is—

1. In a bicycle-wheel the combination of a tubular band having a series of transverse slots ending in openings, the walls of the tube being separated at the tread-surface and having circumferential T-shaped grooves in the sides, a rubber band or tire fitting over the tread-surfaces with its edges secured in the grooves, as and for the purpose described.

2. In a bicycle-tire the combination of a metallic band divided in sections formed by the slots 3, and openings 4, and having a T-shaped longitudinal groove, a U-shaped rubber band fitting over the slots and openings having flanges fitting in the grooves and means for connecting the band with the felly or spokes, for the purpose described.

In testimony whereof I have hereunto affixed my signature in the presence of two subscribing witnesses.

ORMAN W. KETCHAM.

Witnesses:
S. S. WILLIAMSON,
SAMUEL L. TAYLOR.